(12) United States Patent
Galstian et al.

(10) Patent No.: US 8,679,274 B2
(45) Date of Patent: Mar. 25, 2014

(54) METHOD OF MANUFACTURING A LIQUID CRYSTAL DEVICE

(71) Applicant: LensVector Inc., Sunnyvale, CA (US)

(72) Inventors: Tigran Galstian, Québec (CA); Vladimir Presniakov, Québec (CA); Karen Asatryan, Québec (CA); Amir Tork, Québec (CA); Armen Zohrabyan, Québec (CA); Aram Bagramyan, Québec (CA)

(73) Assignee: Lensvector Inc., Sunnyvale, CA (US)

( * ) Notice: Subject to any disclaimer, the term of this patent is extended or adjusted under 35 U.S.C. 154(b) by 0 days.

(21) Appl. No.: 13/627,454

(22) Filed: Sep. 26, 2012

(65) Prior Publication Data

US 2013/0081754 A1 Apr. 4, 2013

Related U.S. Application Data

(63) Continuation of application No. 13/174,685, filed on Jun. 30, 2011, now abandoned, which is a continuation of application No. PCT/CA2009/001820, filed on Dec. 18, 2009.

(60) Provisional application No. 61/142,185, filed on Dec. 31, 2008, provisional application No. 61/142,188, filed on Dec. 31, 2008, provisional application No. 61/142,191, filed on Dec. 31, 2008.

(51) Int. Cl.
*B32B 33/00* (2006.01)
*A63B 39/00* (2006.01)
*A63B 41/00* (2006.01)
*B29C 65/00* (2006.01)
*B32B 37/00* (2006.01)
*B32B 38/04* (2006.01)
*C08J 5/00* (2006.01)
*G02F 1/1335* (2006.01)
*G02F 1/1333* (2006.01)
*G02F 1/1339* (2006.01)

(52) U.S. Cl.
USPC .......... 156/146; 156/90; 156/250; 156/307.7; 349/95; 349/122; 349/153; 349/190

(58) Field of Classification Search
USPC ......... 156/60, 65, 90, 99, 100, 104, 106, 107, 156/109, 145, 146, 250, 273.3, 273.5, 156/273.7, 275.1, 275.3, 275.5, 275.7, 285, 156/286, 290, 291, 292, 307.1, 307.3, 156/307.5, 307.7; 349/1, 56, 73, 84, 95, 349/122, 153, 155, 156, 157, 182, 187, 190
See application file for complete search history.

(56) References Cited

U.S. PATENT DOCUMENTS

| 5,838,414 | A | 11/1998 | Lee |
| 6,219,126 | B1 | 4/2001 | Von Gutfeld |
| 6,337,730 | B1 | 1/2002 | Ozaki et al. |
| 6,414,733 | B1 | 7/2002 | Ishikawa et al. |
| 6,882,399 | B2 | 4/2005 | Park |
| 7,179,512 | B2 | 2/2007 | Ebisu et al. |
| 7,218,374 | B2 | 5/2007 | Park et al. |
| 7,256,859 | B2 | 8/2007 | Kim et al. |
| 7,271,872 | B2 | 9/2007 | Kim |
| 7,280,180 | B2 | 10/2007 | Park et al. |
| 7,426,010 | B2 | 9/2008 | Lee et al. |
| 2001/0004281 | A1* | 6/2001 | Sasaki ........................ 349/190 |
| 2001/0043307 | A1 | 11/2001 | Furukawa |
| 2004/0080703 | A1 | 4/2004 | Lai et al. |
| 2004/0183992 | A1 | 9/2004 | Lee |
| 2005/0122464 | A1 | 6/2005 | Lu |
| 2006/0009579 | A1 | 1/2006 | Miyawaki |
| 2006/0044508 | A1 | 3/2006 | Mochizuki |
| 2006/0098153 | A1 | 5/2006 | Slikkerveer et al. |
| 2007/0258033 | A1 | 11/2007 | Ochi et al. |
| 2008/0002139 | A1 | 1/2008 | Hashimoto |
| 2008/0192195 | A1 | 8/2008 | Liao |

FOREIGN PATENT DOCUMENTS

| GB | 2343965 | 5/2000 |
| JP | 10-239694 A | 9/1998 |
| WO | WO 2005012991 | 2/2005 |
| WO | WO 2006/054803 A1 | 5/2006 |
| WO | WO 2007/122573 A2 | 11/2007 |

OTHER PUBLICATIONS

PCT/CA2009/001820 international preliminary report.

PCT/CA2009/001820 international search report with related claims 1-40.

* cited by examiner

*Primary Examiner* — Phillip C Tucker
*Assistant Examiner* — Brian R Slawski
(74) *Attorney, Agent, or Firm* — Anglehart et al.

(57) ABSTRACT

A wafer level method of manufacturing a liquid crystal optical device removes the need for a rigid barrier fillet while minimizing any risk of contamination of the liquid crystal. An uncured adhesive may be deposited on a bottom substrate and partially cured to form a liquid crystal barrier. After addition of the liquid crystal and a top substrate, the adhesive is fully cured to bond the substrate layers together. An uncured adhesive may be used together with the partially cured adhesive, and may be deposited separately or filled into an extracellular matrix surrounding a plurality of liquid crystal cells. The adhesive may be cured by a variety of means, including light that may be spatially modulated. One or both of the substrates may be deformed during assembly so as to create a structure with a lensing effect on light passing through the liquid crystal region.

14 Claims, 14 Drawing Sheets

Dicing lines

METHOD OF MANUFACTURING A LIQUID CRYSTAL DEVICE

CROSS-REFERENCE TO RELATED APPLICATIONS

This application is a continuation of Ser. No. 13/174,685 filed on Jun. 30, 2011, now abandoned, which is a continuation of PCT patent application PCT/CA2009/001820, filed Dec. 18, 2009, which claims priority of U.S. Provisional Patent Application No. 61/142,185, U.S. Provisional Patent Application No. 61/142,888 and U.S. Provisional Patent Application No. 61/142,191, each of which was filed on Dec. 31, 2008.

TECHNICAL FIELD

The present invention relates to the manufacture of liquid crystal devices, in particular to wafer-scale manufacture of liquid crystal devices.

BACKGROUND

A liquid crystal cell has liquid crystal material between optical substrates. When making a single cell (even one big cell or a 2D array of cells), the liquid is typically side filled in the vacuum, usually by injecting or by capillary action, and then the hole through which the liquid was introduced is sealed. In this way the contact between the liquid crystal and liquid adhesive (before its solidification) is minimized and the region of contact is outside of the working area of the liquid crystal. In modern (e.g., wafer-scale) manufacturing of liquid crystal devices, large arrays of cells are prepared on a common substrate and then are diced into multiple individual units. In this case, side filling is very slow; it generates significant losses of liquid crystal material and creates contamination of the whole structure, requiring, in addition, a post-dicing clean-up and sealing for each unit. So to avoid those problems, in a process known as "drop fill," the liquid crystal material is added in the open cell on a bottom substrate and then the top substrate is then sealed onto the bottom.

In some prior art techniques the same material is used to form container walls and to serve as adhesive (initially liquid) between top and bottom substrates. The spacing between the substrates is assured by spacer beads, which may be mixed with the adhesive that seals the liquid crystal. However, this arrangement can lead to contamination of the liquid crystal by the unhardened adhesive.

FIG. 1 illustrates a wafer level assembly of liquid crystal devices according to the prior art. The industry is moving towards wafer level assembly (WLA) to reduce the cost of manufacturing. In the state of the art, this is applied to displays. In the present invention, this is also applicable to tunable optical devices, such as lenses, and thus the wafer level assembly can comprise arrays of various components, for example, image sensors, infrared filters, lenses, tunable elements (tunable lens, diaphragms, etc.) that are diced or singulated into individual devices. In the figure, wafer 10 includes multiple, simultaneously fabricated devices 12 that are subsequently singulated along the lines separating them, as is known in the art. A key is provided in the figure to distinguish the die boundary, liquid crystal, spacer wall and sealant.

In U.S. Pat. No. 6,219,126 to von Gutfeld and assigned to IBM, there is disclosed such a drop fill technique for liquid crystal displays in which the liquid crystal is contained within a barrier fillet around which an adhesive is placed. A technique such as this is shown schematically in FIG. 2. In this figure, barrier fillet 14 is a hard material and only a few micrometers high, such as lithographically fabricated, and provides the spacing between top substrate 16 and bottom substrate 18 in addition to preventing, during assembly and curing of the adhesive 20, contamination of the liquid crystal material 22 by the adhesive. In one embodiment, a spillover area between the barrier fillet and the adhesive is provided to receive excess liquid crystal if the drop has a greater volume than the cell.

However, lithography cannot be cost effectively used for thick elements (such as approximately 50 micrometer) and the hard walls impose unacceptable (for practical manufacturing processes) precision requirements.

FIG. 3 illustrates the more common approach of using an uncured adhesive as the barrier retaining the liquid crystal drop. In this example, a drop 24 of working liquid is located between two non-cured reservoir walls 26. A bottom substrate 28 and a movable top substrate 30 may be used to enclose the space between the walls 26 allowing the working liquid to be effectively retained within the space defined for the "optical window." Electrodes, thin-film transistors and the like can also be used in the thin layers 32 on the substrates as appropriate for the application in question.

SUMMARY

In accordance with the present invention, a method of manufacturing a liquid crystal device is provided that minimizes the problem of contamination without using a rigid barrier fillet. In a first embodiment, an uncured adhesive is provided on a bottom substrate to act as a liquid crystal retaining barrier. The adhesive is then partially cured and a liquid crystal is placed on the bottom substrate adjacent to the partially cured retaining barrier. A top substrate is then placed in opposition to the bottom substrate so as to contact the adhesive and at least partially enclose the liquid crystal. Finally, the adhesive is further cured to bond together the top and bottom substrates. By partly curing the adhesive, diffusion (and mutual contamination) between the liquid crystal and the adhesive is reduced, while the adhesive retains enough of its ability to adhere to the substrate.

The partial curing of the adhesive may apply to just a first adhesive portion. In particular, a portion of the adhesive that is adjacent to the liquid crystal region may be partially cured to provide a retaining barrier for the liquid crystal that is resistant to contamination. However, a second portion of adhesive may be uncured or only minimally cured. This portion may be further from the liquid crystal region and may be used primarily for bonding the first and second substrates together. In one embodiment, the first and second adhesive portions are separated by an open space and, when the top and bottom substrates are brought together to completely enclose the liquid crystal, an overflow of the liquid crystal into the space between the adhesive portions may result.

After assembly, the adhesive portions may be completely cured to bond the two substrates together. In one embodiment, the adhesive is light curable, and light exposure is used to do the curing. The curing in this case may also be done using spatially modulated light. In one example, the curing light passes through a mask that creates the desired spatial modulation. The spatial modulation may be used, for example, to selectively expose just a first portion of the adhesive that is adjacent to the liquid crystal region to create the partially cured barrier prior to adding the liquid crystal with all of the adhesive being fully cured thereafter.

The prior art method of depositing a barrier fillet is time consuming and leads to reduced yields, particularly when the height of the fillet (corresponding to the thickness of the cell) is higher than several microns. The thickness of liquid crystal lenses are typically from a few to many tens of microns thick. In the present embodiment, the spacing between the substrates can be determined either by the external positioning of the substrates during curing, or by the use of spacer beads or other spacer structures.

It another embodiment of the present invention, the problem of contamination between the liquid crystal and the adhesive sealing the cells may be mitigated by keeping the cell environment (e.g., the bottom substrate) at a reduced temperature at which diffusion between the adhesive and the liquid crystal is reduced. Suitable cooling of the adhesive can be done in a variety of ways, such as blowing cold gas on the adhesive or the bottom substrate from below, or resting the bottom substrate on a cooled surface. Cooling of the surface can also be achieved by Pelletier effect or by any suitable refrigeration technology.

The cooling of the adhesive below ambient temperature serves to render the adhesive essentially inert to the liquid crystal. Thus, an uncured adhesive is deposited on the bottom substrate to act as a liquid crystal retaining barrier. While the adhesive is maintained at a temperature below ambient, the liquid crystal is added within a region adjacent to the retaining barrier. A top substrate is then placed in opposition with the bottom substrate so as to contact the adhesive and enclose the liquid crystal, and the adhesive is then cured. During the assembly process, the adhesive is at a cool temperature to minimize contamination, but must remain deformable to allow the top substrate to be placed on top to seal the liquid crystal within the boundary defined by the adhesive. Moreover, if the adhesive curing is exothermic, then cooling may be required throughout the curing process.

It has also been determined that in the manufacture of liquid crystal imaging devices, such as lenses, the thickness to diameter aspect ratio is such that even for a small diameter lens of 2 mm to 5 mm diameter, the thickness of the liquid crystal layer or layers is too great for practical barrier lithographic deposition. The gap filled with liquid crystal is typically 1-5 microns for a display element or liquid crystal on silicon (LCOS) device with a diameter of 20-200 mm. For a liquid crystal gradient-index (GRIN) lens the gap can be about 30-50 microns for a 2 mm diameter. In embodiments having such geometry, it is practical to use wafer scale manufacturing of the devices in which drop fill of the liquid crystal is used within compressible non-contaminating barrier fillets, along with an adhesive outside the barrier fillet to join the substrates together and allow for singulation by cutting.

In another embodiment of the invention, adhesive is used to fill an extracellular matrix surrounding a plurality of liquid crystal retaining walls. Liquid crystal retaining walls are provided on a bottom substrate so as to define a plurality of liquid crystal cells. Liquid crystal is then located within the cell locations, and a top substrate is placed in opposition with the bottom substrate so as to enclose the liquid crystal between the top and bottom substrates and the retaining walls. An interstitial or extracellular matrix (ECM) surrounding the cells is then flooded with a filling adhesive to bond the substrates together so that dicing or singulation may be performed. In this manner, liquid crystal optical devices, such as lenses, can be manufactured on a wafer scale using, for example, a liquid drop technique to place the liquid crystal within walls defining individual cells in an array on a bottom substrate, and to enclose the liquid crystal within the cells with a top substrate.

As in other embodiments, all or part of the liquid crystal retaining walls may be an adhesive material that is partially cured prior to addition of the liquid crystal, and spacers may be used to fix a spacing between the top and bottom substrates. The adhesive may also be light curable, and spatially modified light (such as light used with a mask) may be used to cure part or all of the adhesive. In some embodiments, a peripheral wall to contain the adhesive filling the ECM is provided, and the ECM is filled in a vacuum environment. In other embodiments, the ECM is filled by capillary action. In some embodiments, the cured adhesive has a rigidity greater than the substrates to facilitate dicing without compromising the substrates.

In yet another embodiment of the invention, one or both of the substrates is bent into a shape that creates a lensing effect in the final optical device. In particular, a liquid crystal retaining barrier structure is formed on a bottom substrate and a liquid crystal is located therewithin. A top substrate is placed in opposition to the bottom substrate so as to enclose the liquid crystal between the top and bottom substrates and the barrier structure. A nonuniform force distribution is then created on at least one of the substrates so as to cause deformation thereof to create a shape that results in a lensing effect on light passing through the liquid crystal region.

This shaping of a planar substrate can be used to form a lenticular liquid crystal lens, although the substrate must be suitably flexible to undergo shaping or flexion. In one variation of this embodiment, the nonuniform force distribution is created by providing a fixed spacing between the substrates at a first location and providing an adhesive between the substrates at a second location that, when cured, contracts to reduce the spacing between the substrates at the second location. Alternatively, a fixed spacing at a first location may be combined with a compressive force at a second location that pushes the two substrates closer to each other at the second location. The fixed spacing may be provided by a rigid fillet. For example, a convex shape to the substrate can be provided by using an epoxy resin, or a compressive force, outside of a previously cured fillet having a generally circular shape.

In other embodiments, the volume of essentially incompressible liquid crystal causes a thickness of the lens to vary from a periphery to a center as the top and bottom substrates are forced closer together outside of the liquid crystal cell due to a contracting adhesive or a compressive force.

BRIEF DESCRIPTION OF THE DRAWINGS

The invention will be better understood by way of the following detailed description of embodiments of the invention with reference to the appended drawings, in which.

DETAILED DESCRIPTION

Figure 1:
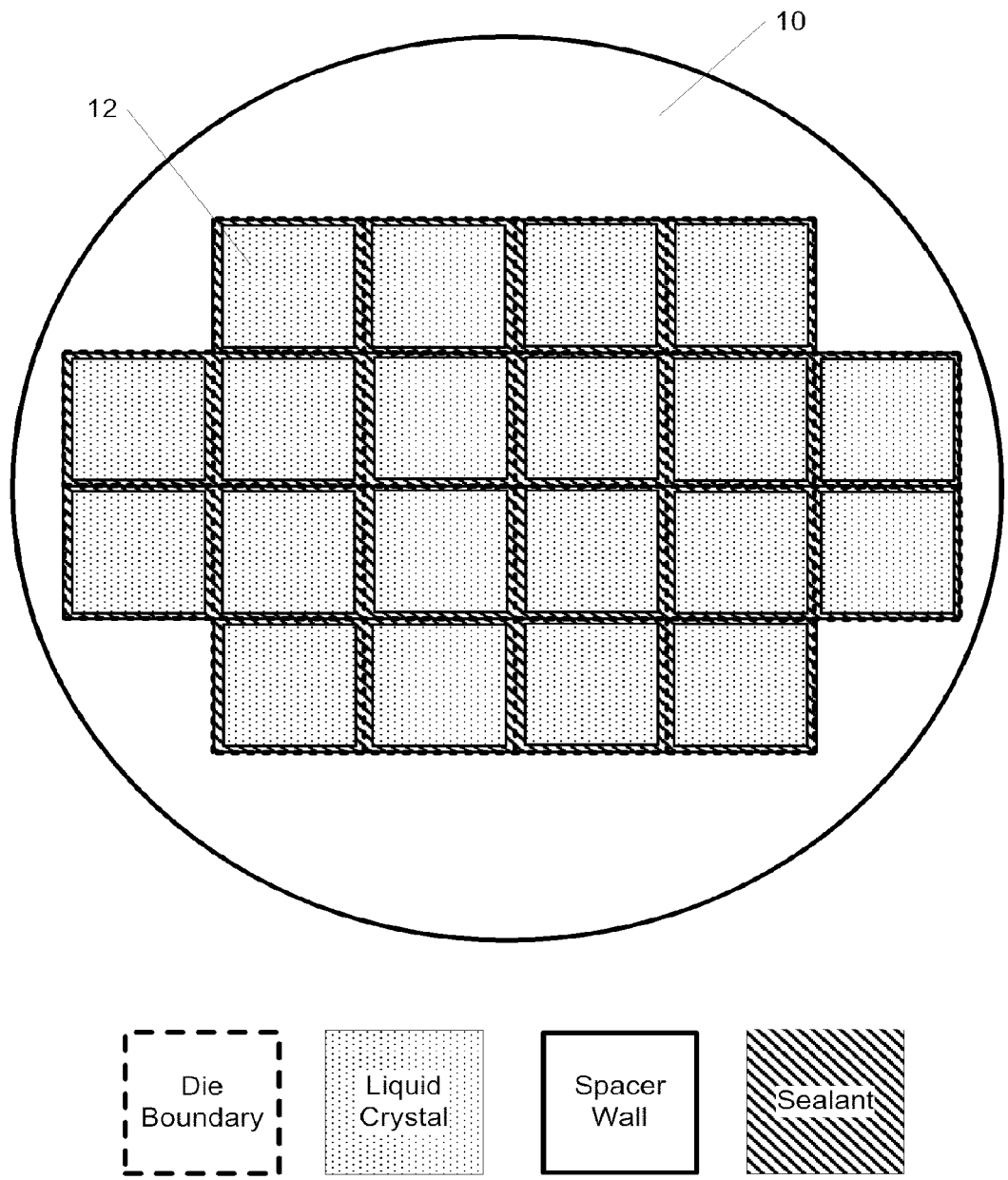
FIG. 1 is a schematic plan view illustration of a prior art wafer level manufacture of liquid crystal devices showing dicing lines.
Figure 2:
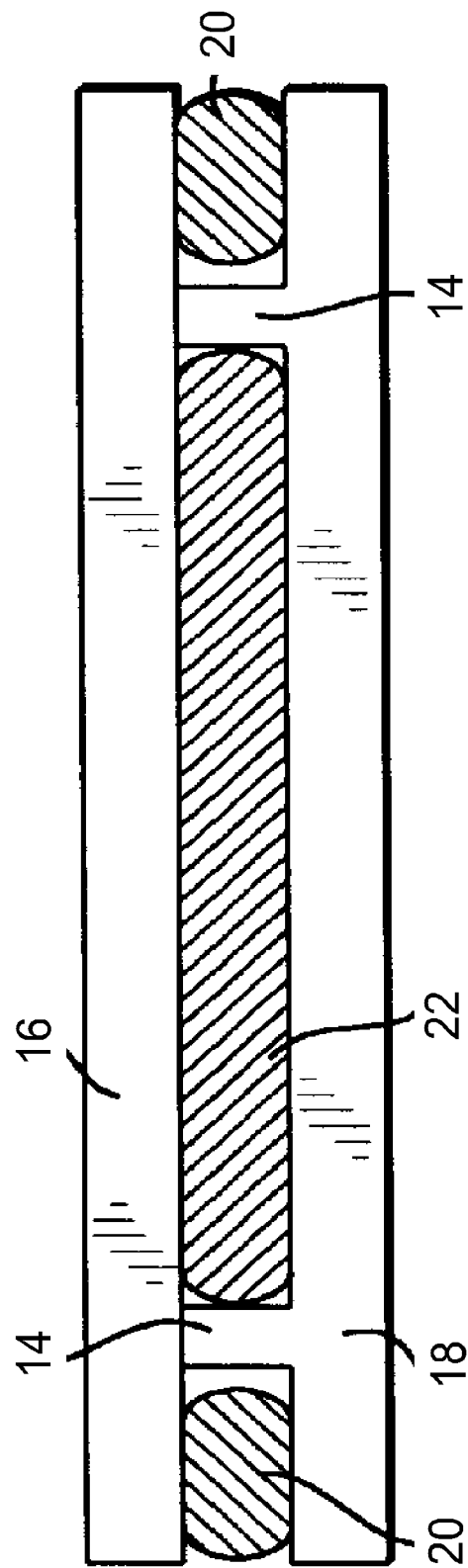
FIG. 2 is a side view of a prior art liquid crystal device that is made using drop fill with a barrier fillet to reduce contact between the liquid crystal and the adhesive.
Figure 3:
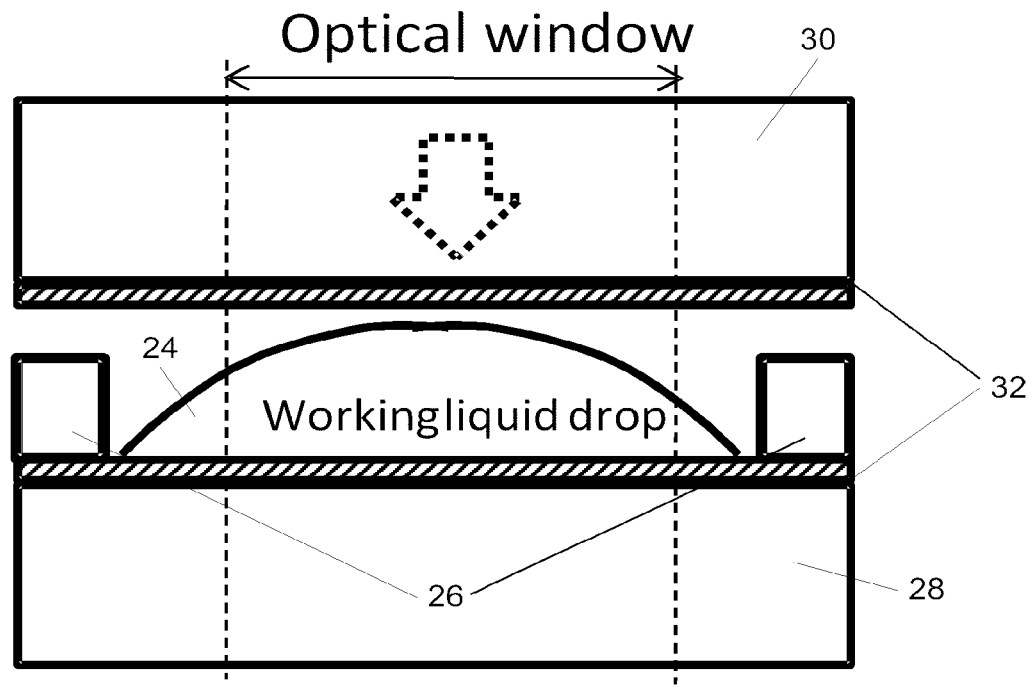
FIG. 3 is a schematic side view of a single liquid crystal device or cell prior to placement of the top substrate, the cell including a drop of liquid crystal contained by an adhesive fillet according to the prior art.
Figure 4:
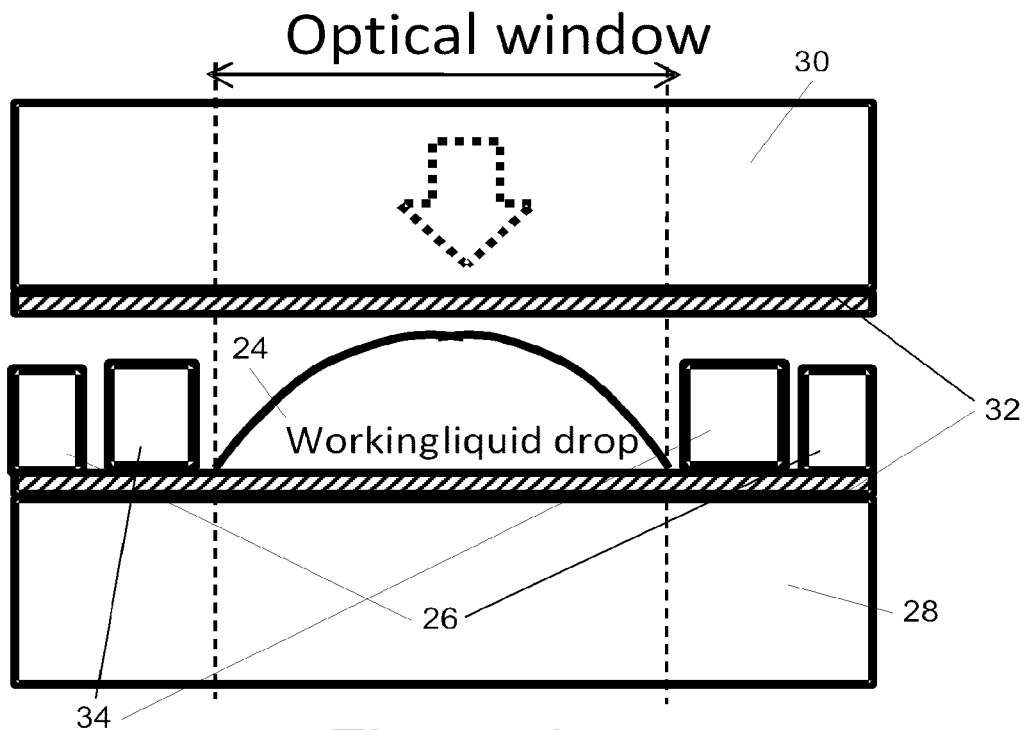
FIG. 4 is a schematic side view similar to FIG. 3, but for which a partly pre-cured adhesive fillet forms a compressible wall containing the liquid crystal with reduced contamination between the liquid crystal and the adhesive.

FIG. 4 illustrates an embodiment of the invention in which partly pre-cured walls 34 are used to retain a liquid crystal 24. The walls 34 are then compressible as the top substrate 30 is placed over the liquid crystal 24 with the result that the liquid crystal is displaced by the top substrate to fill the cell. If the volume of the liquid crystal is greater than the cell volume, a small excess may be expelled over the partly-cured wall. In this embodiment, a space is left between the inner walls 34 and the outer walls 26 of uncured adhesive to receive excess liquid crystal. The liquid crystal within the inner wall, however, remains uncontaminated.

In the embodiment of FIG. 4, the inner wall is partly cured (while having predetermined form) so as to reduce the possibility that it will diffuse into the liquid crystal and contaminate it but, by not being fully cured, the placement of the top substrate 30 flattens the inner wall to achieve the desired spacing. In the case of a liquid crystal lens or beam steering device, this may be approximately on the order of 50 to 200 microns of liquid crystal. The layers 32 of electrodes, alignment layers, thin-film transistors, etc. are optionally used, depending on the application.

Figure 5A:
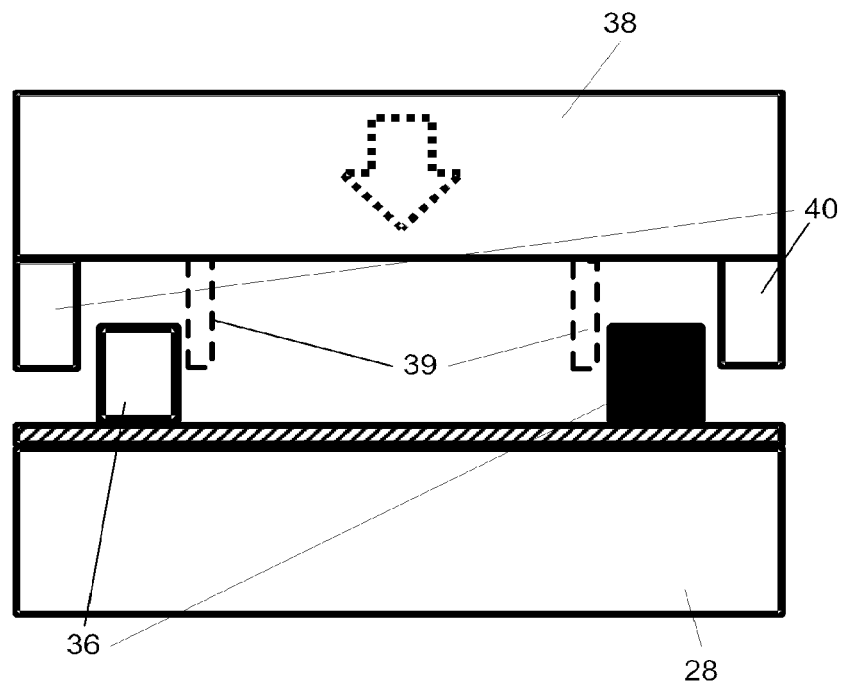
FIG. 5A illustrates a method of formation of the pre-cured adhesive barrier wall using a low adhesion relief structure that imposes a height to the barrier wall.
Figure 5B:
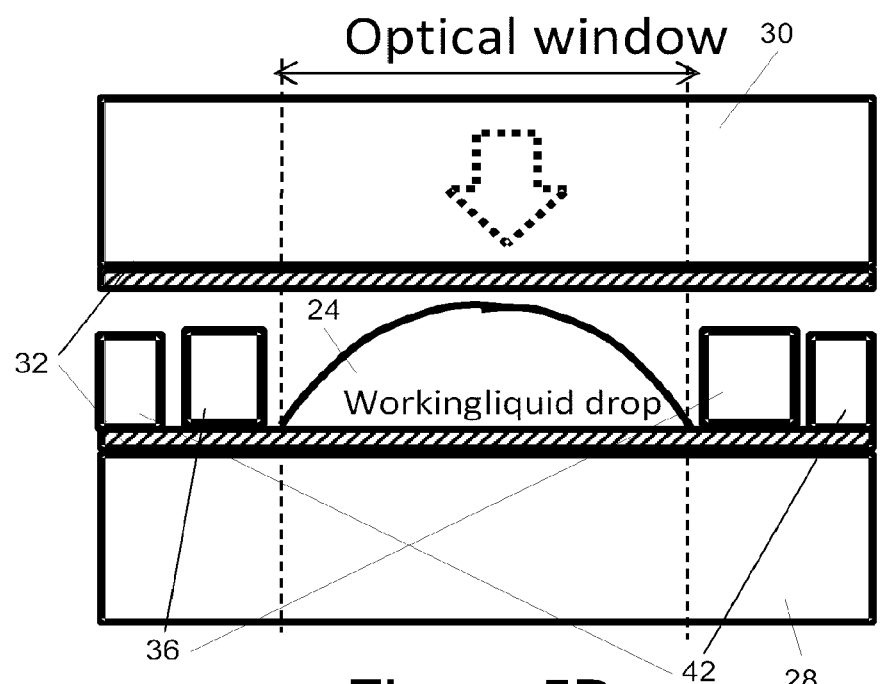
FIG. 5B follows from FIG. 5A and illustrates a subsequent step of adding the top substrate with the adhesive surrounding the pre-cured barrier wall.

In the embodiment of FIGS. 5A and 5B, inner retaining wall 36 may be partly cured or even fully cured. This is so because its thickness is set by placing a temporary form or mold 38 over the wafer assembly to control the height of the walls 36. This form 38 may optionally use spacers 40 to set the height and the form of the inner wall adhesive prior to curing. The spacer can be designed to take into account shrinkage of the adhesive, and can be made to define the inner side or the outer side (as shown in the figure) of the retaining wall 36, or both. Internal walls 39 may optionally be used as well to define the retaining wall 36 and, in one variation, may be used together with walls 40 to provide a frame that would allow injection molding of the walls 36. Once the retaining wall is set the top substrate can be positioned as in FIG. 5B with moderate application of force without damage to the inner wall 36. The inner wall 36 can thus also be used to set the desired spacing between the substrates. The surrounding liquid adhesive 42, placed prior to positioning the top substrate 30, then acts to bond the substrates together and seal in the liquid crystal 24, which is not affected by the inner wall and is not unduly exposed to the adhesive 42 outside of the inner wall. If the inner wall 36 is not fully cured in FIG. 5A, then it can be fully cured in the step associated with FIG. 5B.

It will be appreciated that when the inner wall or retaining barrier is fully cured, a certain level of compressibility or a low Young's modulus is desirable. In some embodiments, the liquid crystal is essentially incompressible and the liquid drop is calibrated to fill the desired volume of the cell with a minimal excess that overflows when the top substrate is applied. The volume of such overflow can be controlled so as to not adversely affect the adhesive surrounding the retaining barrier or inner wall.

Figure 6:
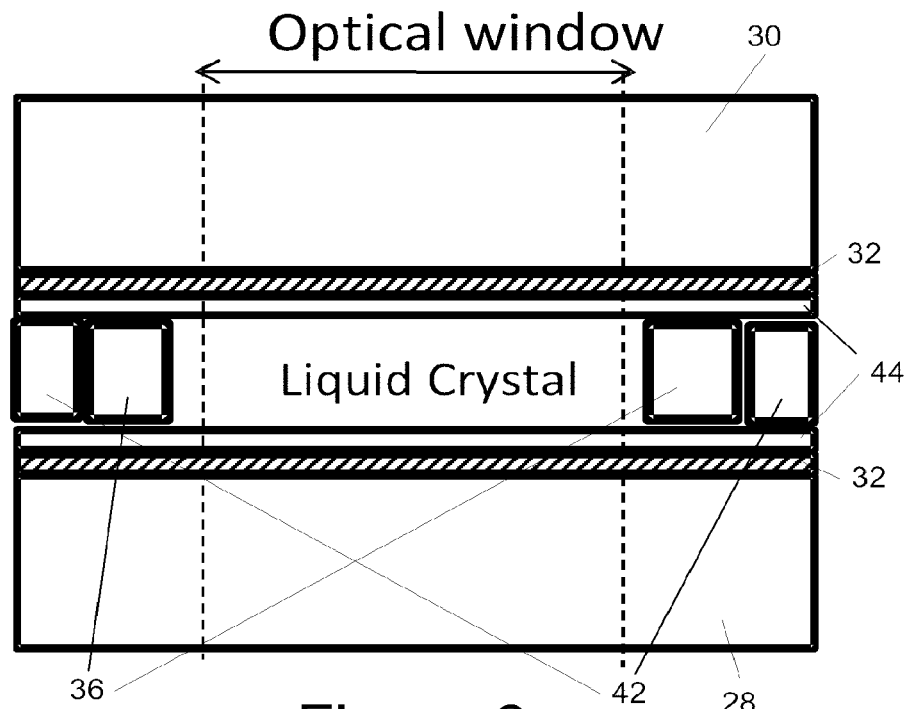
FIG. 6 is a schematic side view of an assembled single liquid crystal device.

FIG. 6 illustrates the assembled version of a device like that shown in FIGS. 5A and 5B. However, also shown in FIG. 6 are alignment layers 44, on associated with top substrate 30, and one associated with bottom substrate 28. These alignment layers provide a pre-alignment of the liquid crystals, as is known in the art.

Figure 7:
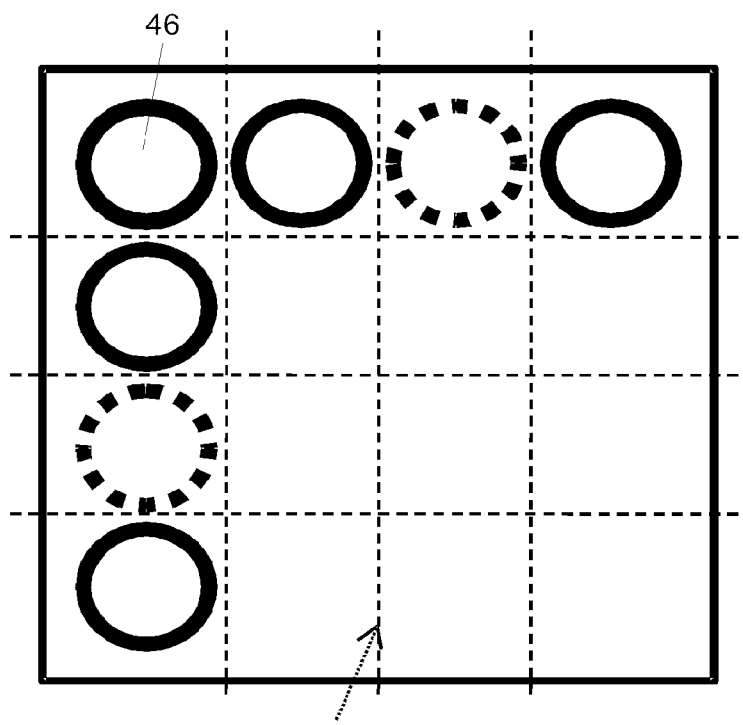
FIG. 7 is a schematic top view of a wafer or array of liquid crystal lens devices prior to singulation.

FIG. 7 illustrates a plan view of an array of devices like those of FIGS. 5A-6. From this figure it can be seen that (in this embodiment) the liquid crystal cells 46 are circular. This geometry may be chosen, for example, for a tunable liquid crystal lens embodiment, although other geometries may also be used. The liquid crystal optical device may also be another type of device, such as a fixed lens, shutter, iris, display device, etc. Also shown in FIG. 7 are dicing lines indicating where the wafers may be cut to singulate the individual devices 46.

It will be appreciated that the inner wall or the outer wall may also contain spacers, such as spacer beads. The volume change of the adhesive, if any, will apply forces to the structure. Such forces may be supported by spacers and the substrates without affecting the geometry and optical properties of the device.

Shrinking of the adhesive can be a problem if the force of the shrinking adhesive on the substrates is too great, considering that the liquid crystal is essentially incompressible. The effect can be controlled and used to bend the substrate in a desirable manner, as discussed hereinafter. The amount of force exerted by the adhesive causes the substrate of the appropriate flexibility to bend, with the adhesive and substrate having the desired geometry to yield a desirable lenticular shape to the substrate. However, in cases where shaping of the substrate is not desired, excessive force is to be avoided. The amount of shrinking and the Young's modulus of the adhesive must be chosen accordingly, in addition to any use of rigid spacers.

It will also be appreciated that the inner wall may be partly cured to reduce the effect of contamination, while retaining the ability to adhere to the top substrate for final curing and bonding. In such embodiments, a single wall can be used.

Figure 8:
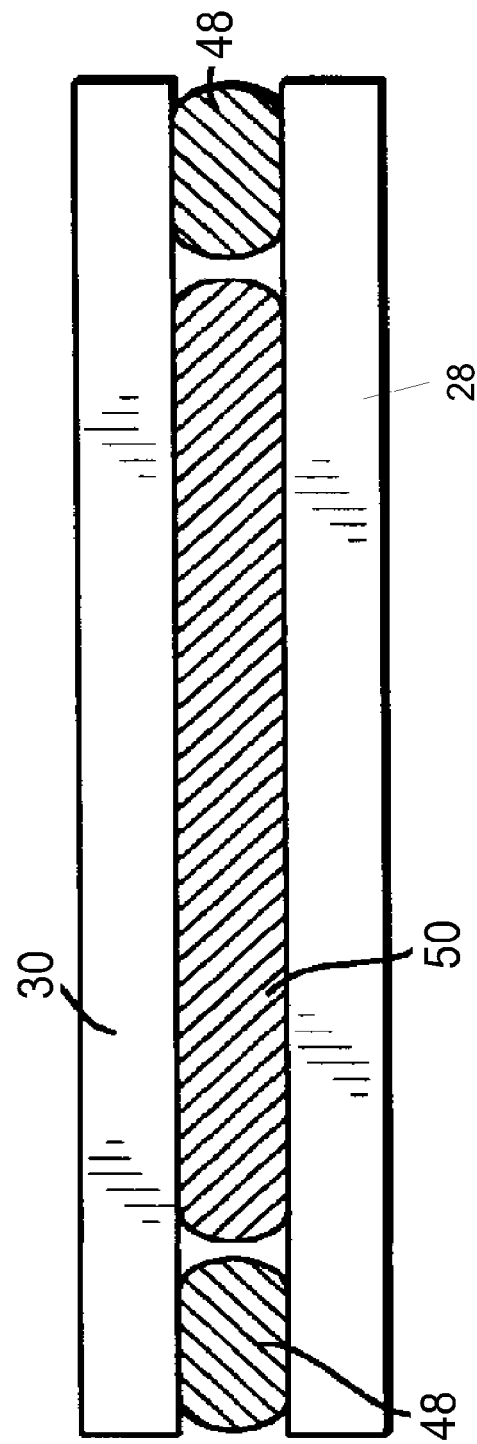
FIG. 8 is a schematic side view illustration of the assembly of a cell using a cooled environment that reduces the contamination between the adhesive and the liquid crystal material.

In the embodiment of FIG. 8, the liquid crystal cell is made using a cooled environment. The wall of uncured adhesive 48 is placed on the bottom substrate 28 and cooled. The liquid crystal material 50 is then added as a drop fill. The liquid crystal may be pre-cooled, or it may be cooled after being placed on the bottom substrate 28. The cool temperature shrinks those materials, and reduces the contact area and the chance of diffusion of chemical substances between the adhesive 48 and the liquid crystal material 50 during the time before the adhesive is cured. The top substrate 30 is placed over the liquid crystal drop and contacts the liquid crystal and the adhesive to seal in the liquid crystal within the cell. Either of the substrates 28, 30 may also be pre-cooled. The curing solidifies the adhesive and bonds the substrates together. The technique can be applied to the manufacture of a single cell or wafer level assembly process. Since the device is typically designed for use at higher temperatures, subsequent warming results in the LC material 50 expanding and filling the air gaps between the liquid crystal material 50 and the adhesive 48.

Figure 9:
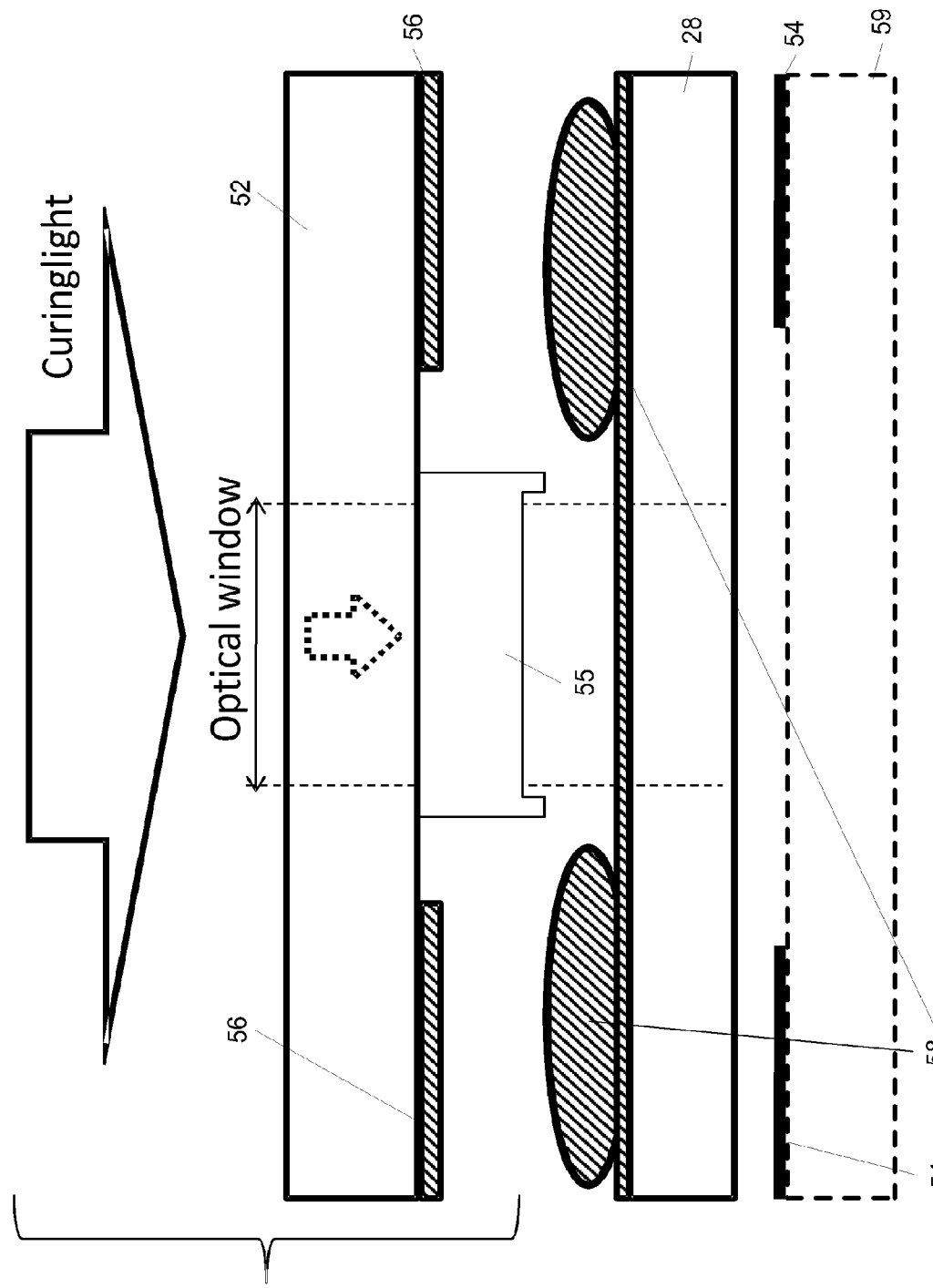
FIG. 9 is a schematic side view that illustrates the use of a mask structure in curing the "internal" part of the adhesive walls to minimize the inter-diffusion of liquid crystal with adhesive molecules.

In the embodiment of the FIG. 9, a "mask" structure 56 is used that may help to cure the "internal" part of the adhesive walls to minimize the inter-diffusion of the liquid crystal and adhesive molecules. The mask 56 may be fabricated on a transparent substrate 52 that allows light used for curing (such as ultraviolet light) to pass through it. The zones that are not to be cured may be protected by non transparent zones (such as a metallic disc for example). A spacer 55 for the UV mask may also be used to allow it to keep a predefined distance from the bottom substrate 28 (the spacer itself is shaped so that it will not contact the surface of the working area, thereby avoiding contamination). The mask and light exposition may be applied from one or both sides (a second mask structure 54 is shown adjacent to a bottom substrate 59, which is depicted in broken lines as being optional). The spectral characteristics of the curing light and the photo initiation complex of the adhesive 58 are chosen in a way to limit the penetration of that light into the volume of the adhesive. For example, light having a 514 nm wavelength can penetrate only several micrometers into chalcogenide glass material As2S3, while light having a wavelength of 632 nm may penetrate into the same material several tens of micrometers. A similar approach may be used for the adhesive-container of the liquid crystal and its curing light to limit the sizes of curing zones (note that typically, the height of the wall may be at the order of 50 micrometers while its width may be several hundreds of micrometers).

Figure 10:
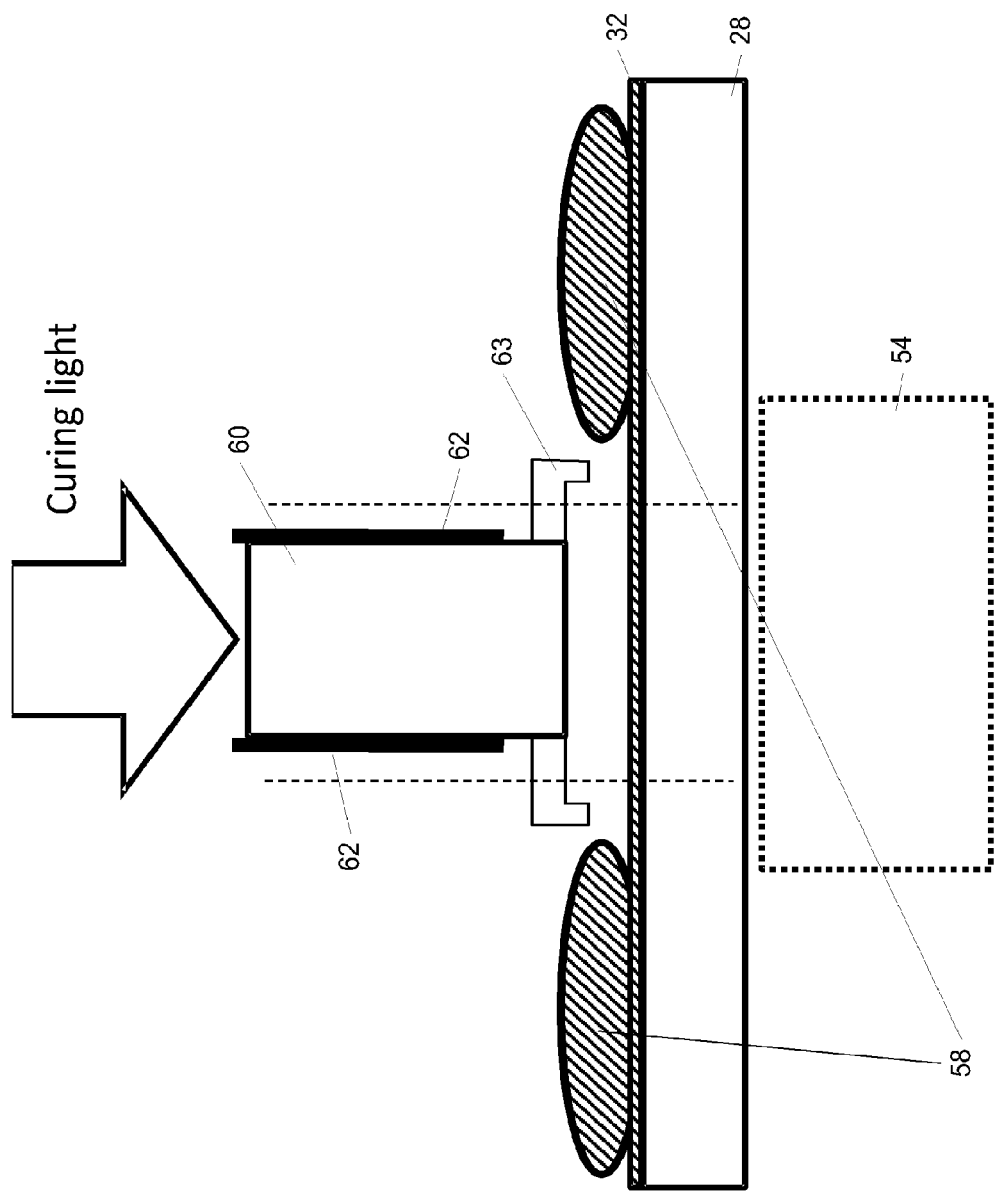
FIG. 10 is a schematic side view that illustrates another method of performing the operation of FIG. 9 including curing of the internal part of the adhesive by means of a special light, heat or moisture guide.

FIG. 10 depicts another method of performing the same operation (as described above) of curing of the internal part of the adhesive 58. Here, a special waveguide 60 of appropriate diameter may be used to guide the curing light down to the area where the liquid crystal must be dropped. The masking zones 62 here are blocking walls deposited on the sides of the waveguide (made out of reflective surfaces, for example) that create a window that lets the curing light escape in the desired direction only. This would allow for the curing of the "internal" part of the adhesive ring, while not curing their "external" part. As with the embodiment of FIG. 9, a spacer 63 may be used in the arrangement of FIG. 10 to ensure a predefined distance is maintained between the bottom substrate 28 and the waveguide, while avoiding contact with, and contamination of, the working area.

If the wavelength of the curing light and the absorption of the adhesive (at that wavelength) are chosen in the appropriate way, only the desired depth of penetration of curing light and corresponding curing would be achieved. However, once initiated, the photo polymerization process may slowly progress even in the zones which were not exposed. To limit this effect, the assembly process must be reasonably fast, but having the adhesive at cold temperatures will also slow the effect.

Those skilled in the art will recognize that other methods of curing the adhesives may be used too, for example, heat, moisture, etc. In these cases, a corresponding local excitation can also be used, such as a local heat source or local release of moisture, etc. In such a case, a method similar to that described above may be used in which heat or moisture are guided to the desired areas and released.

Another embodiment of the present application uses dual curable materials, that is, materials that are curable using two different processes. In one example, the internal part of an adhesive may use dual polymerizable monomers (e.g., UV and Thermal curable mixture). In such a case, by UV exposition of the internal part, a UV-curable monomer will be polymerized and lead to increased viscosity of the mixture, thereby reducing the risk of liquid crystal contamination. Thereafter, the thermally curable part of the mixture is polymerized, in this case thermally.

Figure 11:
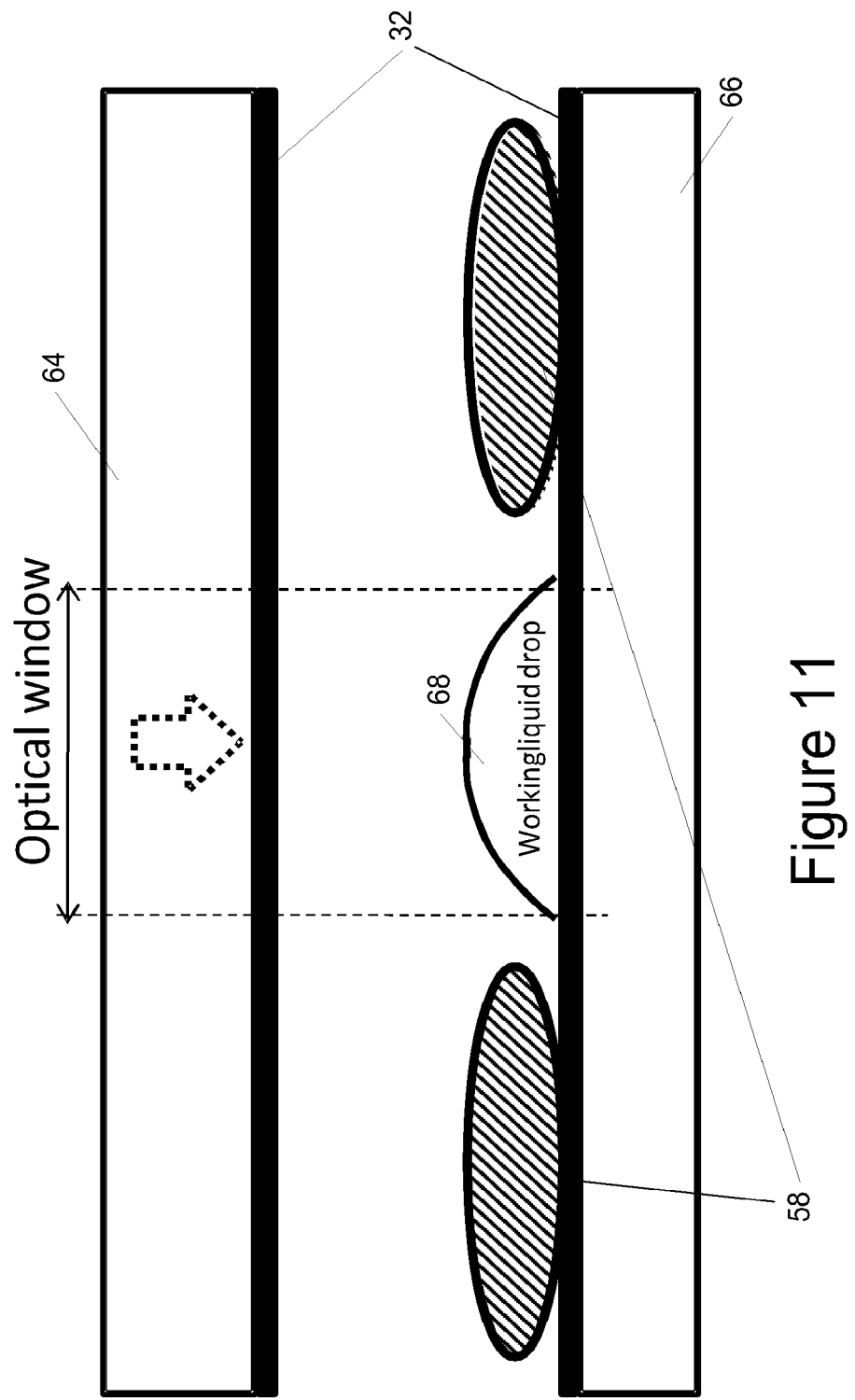
FIG. 11 is a schematic side view of a final assembly step when an internal part of an adhesive ring is partially cured using the methods of FIG. 9 or 10.

After the partial curing of the adhesive in either of the embodiments of FIGS. 9 and 10, the top substrate 64 is moved into place, as shown in FIG. 11. In this final assembly step, after the internal part of the adhesive ring is partially cured using one of the methods described, the two substrates 64, 66 are bonded together by the uncured portion of the adhesive, while the partially cured "internal" portion prevents contamination of the liquid crystal 68.

Figure 12:
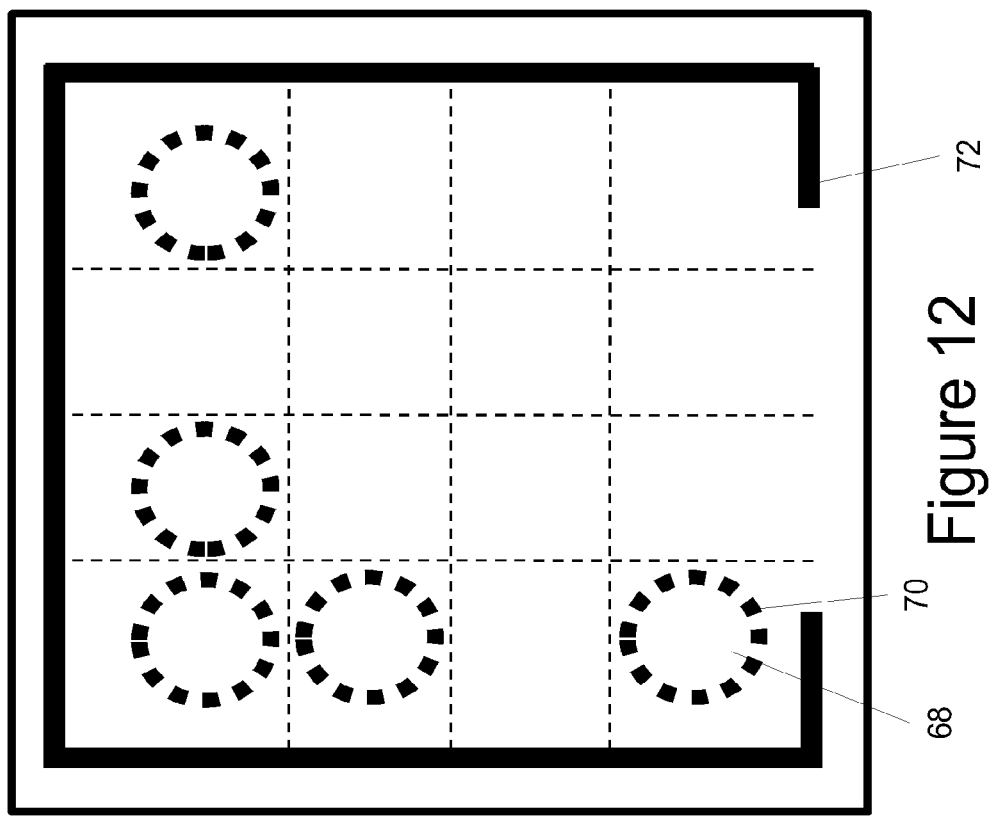
FIG. 12 is a schematic plan view of a wafer of optical devices having a peripheral U-shaped wall.

Shown in FIG. 12 is a schematic plan view of a wafer of liquid crystal optical devices similar to that of FIG. 7. As previously mentioned, wafer scale fabrication of the devices involves the use of common substrate layers, which are broken into individual segments only during the singulation process. In the FIG. 12 embodiment, a one step "back fill" sealing and bonding of the substrates is performed. There is "built" on the bottom substrate an array of "inner rings" 70 (made from a flexible, elastomeric and low Young modulus material that may be partially or completely cured). Thereafter, a peripheral U form 72 (or wafer "outer wall") is formed that encloses the whole array. The liquid crystal 68 is then drop filled in the centers of the rings 70, after which the top substrate (not shown) is pressed into place against those rings. While maintaining the appropriate pressure, the area within the U form 72, but outside the rings 70, is vacuum filled by another adhesive. This fill adhesive is then cured to seal the structure together. Spacers may be used to ensure that a spacing between the substrates is fixed as pressure is applied between the substrates. Alternatively, the substrates may be held at an appropriate distance by a precision jig while curing of the adhesive takes place.

Figure 13:
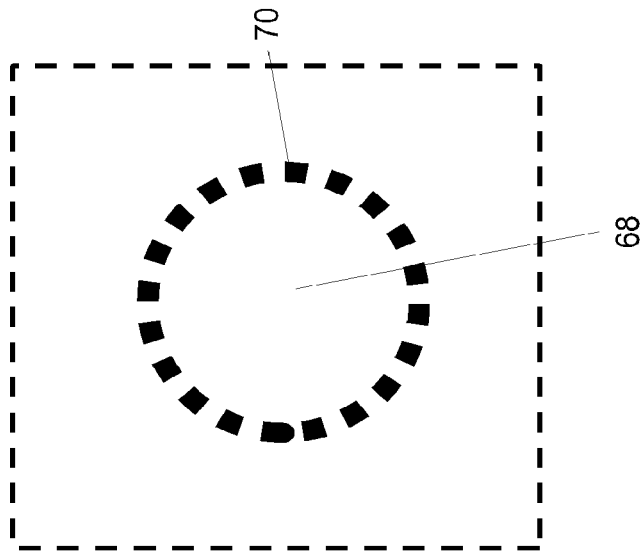
FIG. 13 is a schematic plan view of a liquid crystal optical device singulated from a wafer such as that shown in FIG. 12.

As mentioned above, shrinking of the adhesive can be a problem at times, but the amount of final deformation may be reduced in the present invention by adjusting the pressure applied to the adhesive fed into the space between the wafer substrates and the cells. A controlled overpressure prior to curing the adhesive can reduce the amount of shrinking induced reduction in the spacing between the substrates. After sealing of the structure, dicing of the wafer yields singulated optical devices such as that illustrated in FIG. 13.

Figure 14:
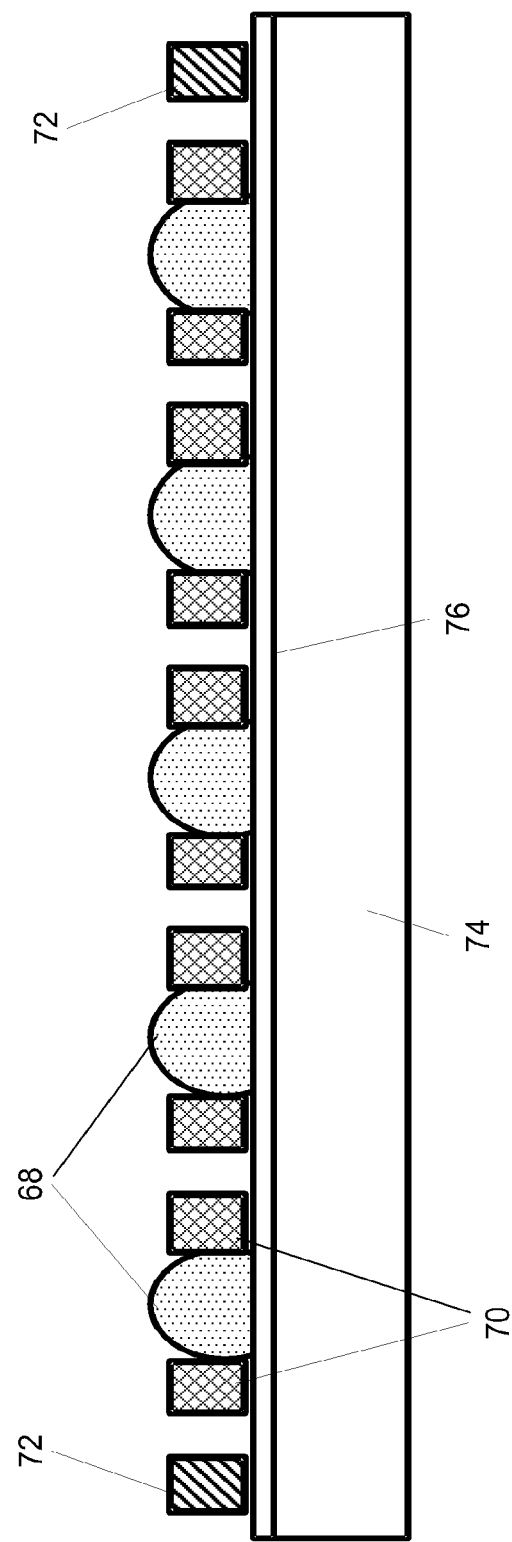
FIG. 14 is a schematic side view of a wafer such as that shown in FIG. 12 following liquid crystal drop fill.

FIG. 14 is a schematic side view of the structure of FIG. 12. The bottom substrate 74 supports an optional "active" layer 76, such as an optional electrode alignment layer or thin-film transistor that may be used with the individual devices. The peripheral adhesive wall ("U form") 72 resides along the outside of the substrate with the partially cured "internal" walls 70 being distributed within. These internal walls define the optical window for each device and are sufficiently separated from each other to allow them to be easily singulated once the structure is complete. The internal walls may be made of flexible, elastomeric and appropriate Young modulus materials deposited, or otherwise fabricated (such as by molding, stamping, etc.) on the bottom substrate, after which they are filled with the liquid crystal 68.

Figure 15:
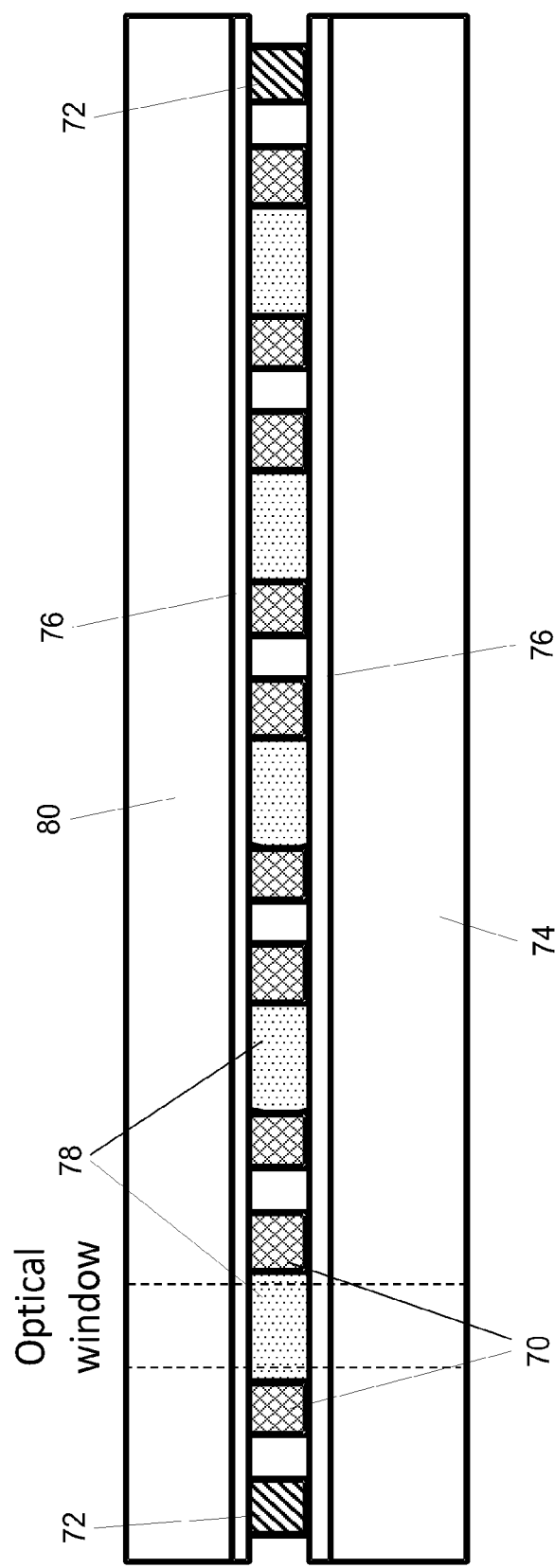
FIG. 15 is a schematic side view of a structure such as that shown in FIG. 14 following the placement of a top substrate.

FIG. 15 shows the structure of FIG. 14 with the top substrate 80 (having an optional coating of an active material 76) in place. The structure is maintained together with a predetermined pressure while the assembly process is completed. The array is thus "closed" on three peripheral sides by the cured peripheral adhesive 72.

Figure 16:
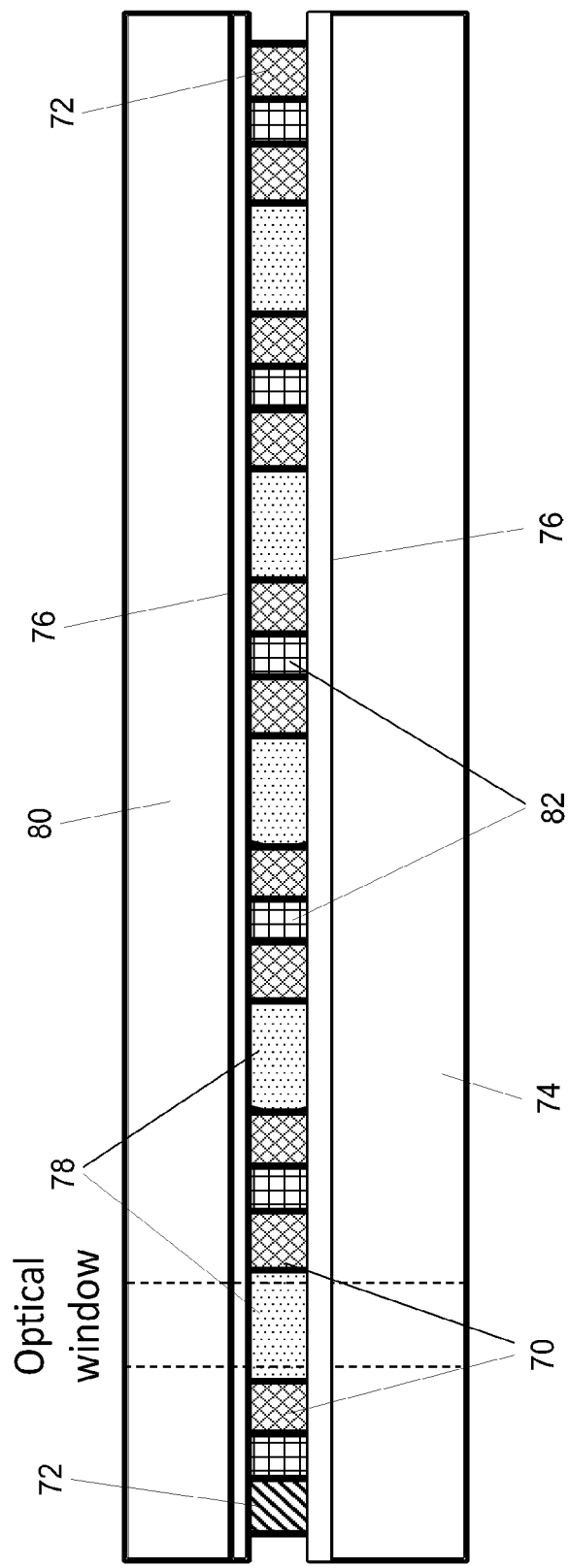
FIG. 16 is a schematic side view of a structure such as that shown in FIG. 15 after filling with an adhesive.

FIG. 16 shows the "sandwich" structure of FIG. 15 being "vacuum filled" by an adhesive 82, which is then cured while the sandwich is still maintained under appropriate pressure. The array may then be used for other purposes or diced in the filled adhesive areas. The step of filling with adhesive 82 can alternatively be accomplished by capillary action, or the structure can be held vertically and filled by pumping a bonding agent from the bottom up to fill the extracellular matrix structure without air pockets.

Figure 17:
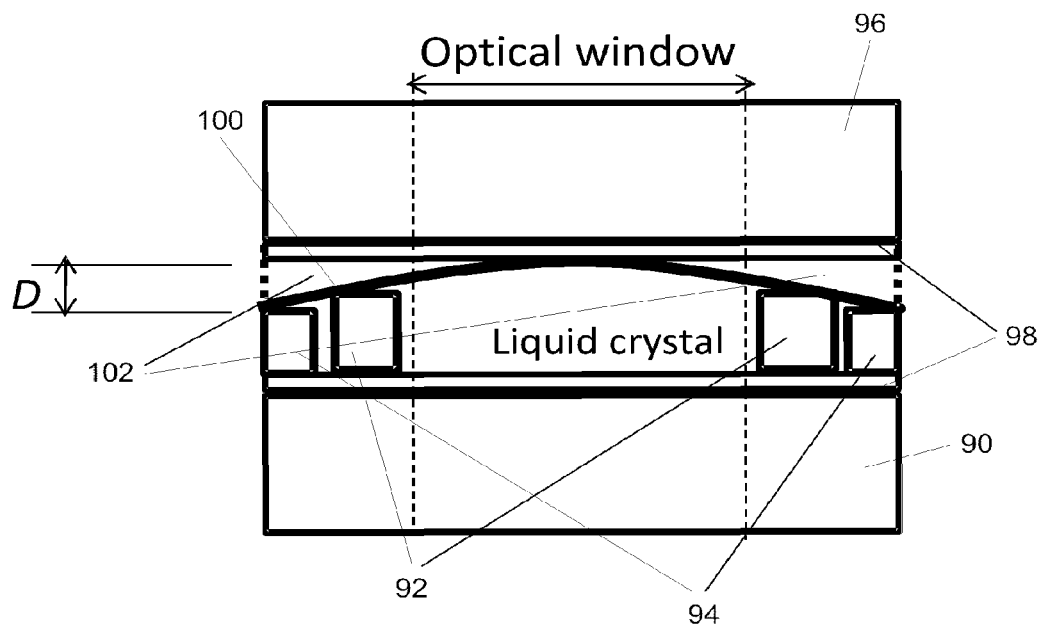
FIG. 17 is a schematic side view of a liquid crystal device structure for which shrinking of an adhesive results in bending of a top substrate.

FIG. 17 shows an embodiment in which the outer adhesive shrinks during curing with the effect of curving the top substrate. In this embodiment, the bottom substrate 90 supports pre-cured adhesive walls 92 that contain the liquid crystal with minimal contamination, as well as the cured adhesive walls 94 that bond the bottom substrate 90 and top substrate 96 together. As in other embodiments, the adhesive walls 92, 94 may optionally include spacers, and optional active layers 98 may be included on the substrates 90, 96. In the present embodiment, the adhesive used for the cured walls 94 may be selected to have a predetermined degree of shrinkage as it is cured and, in particular, a higher degree of shrinkage than the adhesive of the pre-cured walls 92. If selected correctly, this results in adhesion to the top substrate 96 and a subsequent predetermined deformation of the top substrate 96 as the portion of it adjacent to the walls 94 is pulled closer to the bottom substrate 90 than the portion adjacent to the walls 92. The use of two walls having a differential in shrinkage (or the internal one "made" in advance as described above) can thus be used to shape the substrate. Notably, a small change in the shape of the top substrate 96 can have a significant optical power effect on the device. While the geometry of FIG. 17 is shown to create a disk-shaped volume (with variable thickness) of liquid crystal, the technique can also be used for non-circular geometries with the volumes of adhesive providing the desired amount force on the substrate.

A similar effect can also be achieved by providing a sufficient volume of adhesive 92 surrounding the liquid crystal volume and by creating a good seal prior to fully curing that adhesive with the result of shrinking it. If the space is completely full of liquid crystal, the contraction of the adhesive can cause the substrate to bulge at the center due to the volume of liquid crystal, while remaining narrower in thickness at the circumference. Also, the external adhesive 94 may preferably contain spacers to ensure a controllable and reproducible deformation.

The embodiment of FIG. 17 illustrates a structure with an intentionally curved upper substrate. This embodiment includes two variations. In the first variation, the upper substrate 96 is a single substrate (as described above) and the curved line 100 of the figure represents the curvature of the upper substrate following curing. However, in a second variation of this embodiment, the curved surface represented by line 100 is a separate intermediate substrate that is covered by a flat top substrate 96. In this second variation, it is possible to have a small, annularly tapered volume 102 between the curved substrate 100 and the top flat substrate 96. This small volume can be filled with a material that alters the electric field. For example, a planar electrode can be provided on the top substrate 96 as shown, and a transparent material located within the small volume 102 can be a material with a high dielectric constant (or a weakly conductive and dispersive material) such that the electric field is modulated more as a function of radial position. Such a transparent material preferably can be selected to have the same index of refraction (as surrounding substrates) so as not to affect the optical power of a lens created using this arrangement (i.e., zero optical power at zero control voltage), although in other embodiments, the material filling the small volume 102 can have an index of refraction that matches the top substrate 96, while the intermediary substrate 100 and the shaped liquid crystal provide a lens in the absence of a control electric field.

The use of a material in the volume 102 that affects the electric field is similar to the use of a hidden electric field modulation layer as described in more detail in WO/2007/098602, the specification of which is hereby incorporated by reference as if fully set forth herein. The material that affects the electric field can be a high dielectric constant material with an electric field that does not use frequency to control optical power as described in the mentioned PCT publication. Alternatively, it can be a material that is weakly conductive that does not use frequency to determine optical power but for which the weak conductivity acts to shape the electric field. This is particularly useful when the electrodes create a patterned electric field and the weakly conductive material shapes the patterned electric field. Alternatively, the material can have a complex dielectric constant with the frequency of the control field being used to select optical power independently of electric field control signal voltage.

It will be appreciated that the flexibility of the substrates, namely Young's modulus and thickness, are parameters that need to be chosen to control the ability of the substrates to bend. The optical index of refraction of each substrate is therefore also a parameter that enters into the design of the resulting lens. In FIG. 17, the lens is shown to have only the top substrate 96 bend. This can be achieved by providing a bottom substrate 90 that is more rigid that the top substrate 96.

While liquid crystal lenses in general may be tunable and may use a spatially modulated electric field to establish a planar geometry gradient index (GRIN) lens, it will be appreciated that a bent substrate liquid crystal lens can also be a static lens, or a tunable lens that does not require a spatially modulated electric field. Thus the optical power of the lens can be due to the substrate geometry or due to the GRIN lens effect of the liquid crystal, or an effective combination of both. It will be understood that only a small amount of substrate flexion (greatly exaggerated in FIG. 17) is sufficient to provide significant optical power. Such small flexion can have a minor impact on the electric field spatial modulation and can allow the lens to be controlled by transparent electrodes on the substrates without further spatial modulation of the electric field. Moreover, to control the amount of shrinking of the adhesive that, in turn, controls the base optical power of the lens, spacer elements can be used.

Figure 18:
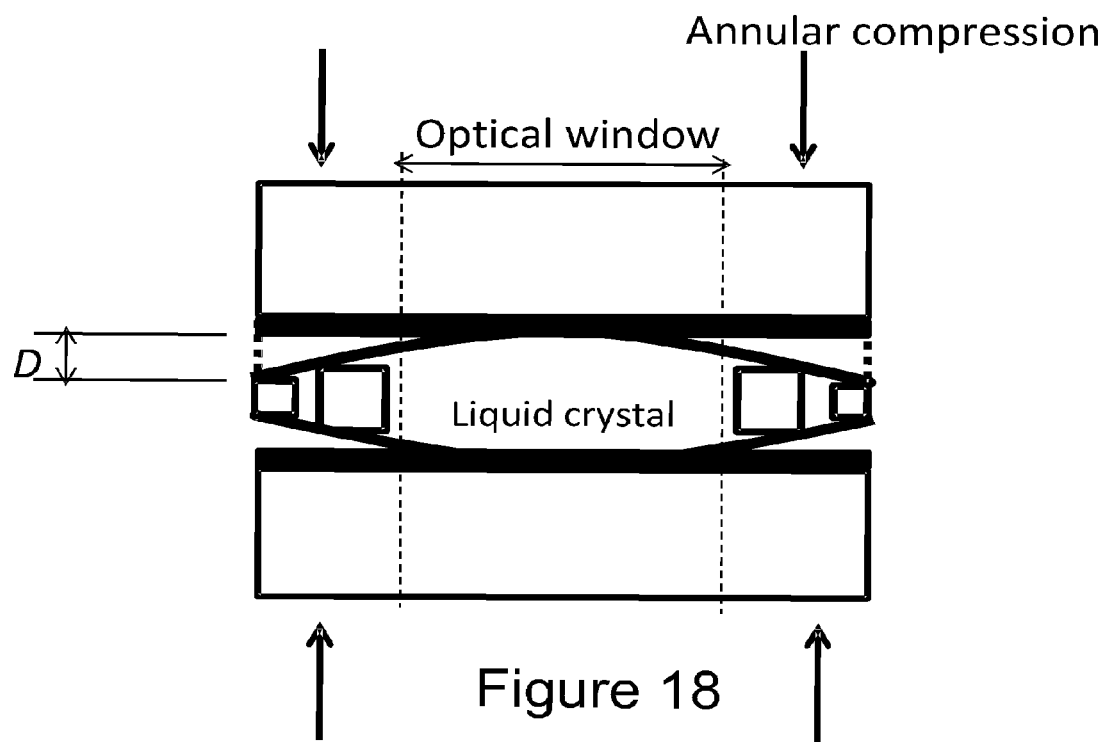
FIG. 18 is a schematic side view of a liquid crystal structure for which a top substrate and a bottom substrate are bent with annular compression during curing of an adhesive.

In the embodiment of FIG. 18, two additional features are schematically illustrated. The first is that the lens is not plano-convex as in FIG. 17 but, rather, convex. The second is that the shape of the lens structure is not imparted by shrinking of the adhesive but, rather, by using an external ring (not shown) to apply compression force at the circumference of the circular lens during curing. Thus, the convex shape is maintained by mechanical force while the adhesive is cured. With the liquid crystal sealed within the cell between the substrates and the sealing side wall, the compression force acting on the incompressible liquid crystal causes the center of the substrates to bulge as the circumference, or periphery, is squeezed together. It will be appreciated that an alternate mechanism, such as a ring clamp can be applied to maintain the shape. It will also be appreciated that a concave lens can similarly be provided by an expansion force. For example, if the volume of the adhesive material 94 of FIG. 17 expands during curing, and the substrate adhered to the adhesive 92 as well, a concave shape could be created.

For example, it will be appreciated that, in all the previous embodiments describing the substrate bending, the internal surfaces of those substrates may be processed (e.g., rubbed) in advance in the planar state, the effect of such processing being still functional after the bending.

While the invention has been shown and described with reference to preferred embodiments thereof, it will be understood by those skilled in the art that various changes in form and detail may be made herein without departing from the spirit and scope of the invention as defined by the appended claims.

What is claimed is:

1. A method of manufacturing a liquid crystal device comprising:
    providing on a bottom substrate an array of liquid crystal retaining walls that define liquid crystal cells and an extracellular matrix that surrounds the liquid crystal cells,
    providing liquid crystal on the substrate within the liquid crystal cells;
    placing a top substrate in opposition to the bottom substrate so as to enclose the liquid crystal between the top and bottom substrates and the retaining walls;
    filling the extracellular matrix with a filling adhesive that bonds together the top and bottom substrate to form a wafer, wherein the filing adhesive provides support for mechanical singulation; and
    dicing the wafer to singulate the liquid crystal cells.

2. The method as claimed in claim 1 wherein providing an array of retaining walls comprises depositing a retaining wall adhesive material on the bottom substrate and at least partially curing the retaining wall adhesive material prior to the addition of the liquid crystal.

3. The method as claimed in claim 2 wherein said at least partially curing of the retaining wall adhesive comprises at least partially curing a first portion of the retaining wall adhesive that resides adjacent to the liquid crystal cell and curing to a significantly lesser degree a second portion of said retaining wall adhesive further from the liquid crystal cell than the first retaining wall adhesive portion.

4. The method as claimed in claim 1 further comprising fixing a spacing between the top substrate and the bottom substrate by one of: holding the top substrate with respect to the bottom substrate at a desired distance and locating spacers between the top substrate and the bottom substrate so as to fix a spacing therebetween.

5. The method as claimed in claim 2 wherein said retaining wall adhesive is light curable, and said partly curing is performed using spatially modulated light.

6. The method as claimed in claim 5 wherein partially curing said retaining wall adhesive comprises partially curing said adhesive using light passing through a mask.

7. The method as claimed in claim 5 wherein partially curing said retaining wall adhesive comprises partially curing said retaining adhesive using a light source that directs light to a first portion of the retaining wall adhesive that is adjacent to the liquid crystal region.

8. The method as claimed in claim 1 wherein the filling adhesive is deposited in an uncured state and wherein the method further comprises curing the filling adhesive.

9. The method as claimed in claim 1 further comprising a peripheral barrier that surrounds a plurality of the liquid crystal cells and defines an outer wall of the extracellular matrix.

10. The method as claimed in claim 1, wherein said liquid crystal device is a lens.

11. The method as claimed in claim 10, wherein the lens is a GRIN lens.

12. The method as claimed in claim 1, wherein filling the extracellular matrix with a filling adhesive comprises vacuum filing the extracellular matrix with the filling adhesive.

13. The method as claimed in claim 1, wherein filling the extracellular matrix with a filling adhesive comprises allowing the filling adhesive to seep into the extracellular matrix via capillary action.

14. The method as claimed in claim 1, wherein filling the extracellular matrix with a filling adhesive comprises pumping bonding agent from a bottom of a vertically oriented wafer, wherein pumping bonding agent from the bottom reduces air pockets.

* * * * *